(12) United States Patent
Fornage

(10) Patent No.: US 8,411,790 B2
(45) Date of Patent: Apr. 2, 2013

(54) POWER LINE COMMUNICATIONS APPARATUS

(75) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 13/336,569

(22) Filed: Dec. 23, 2011

(65) Prior Publication Data

US 2012/0099661 A1 Apr. 26, 2012

Related U.S. Application Data

(63) Continuation of application No. 12/807,089, filed on Aug. 27, 2010, now Pat. No. 8,107,516.

(60) Provisional application No. 61/275,350, filed on Aug. 28, 2009.

(51) Int. Cl.
*H04L 27/00* (2006.01)

(52) U.S. Cl. ............... 375/295; 340/538; 340/12.32; 455/462

(58) Field of Classification Search .......... 340/538, 340/538.11
See application file for complete search history.

(56) References Cited

U.S. PATENT DOCUMENTS

| | | | |
|---|---|---|---|
| 4,992,774 A | 2/1991 | McCullough | |
| 5,257,006 A | 10/1993 | Graham et al. | |
| 5,404,127 A | 4/1995 | Lee et al. | |
| 5,818,127 A | 10/1998 | Abraham | |
| 5,952,914 A | 9/1999 | Wynn | |
| 6,741,196 B2 | 5/2004 | Keasler, Jr. | |
| 7,199,699 B1 | 4/2007 | Gidge | |
| 7,518,441 B2 | 4/2009 | Nesimoglu et al. | |
| 7,912,377 B2 | 3/2011 | Koga | |
| 7,932,790 B2 | 4/2011 | Rexberg et al. | |
| 2002/0041228 A1* | 4/2002 | Zhang | 340/310.01 |
| 2002/0071452 A1 | 6/2002 | Abraham | |
| 2007/0152628 A1 | 7/2007 | Lee | |
| 2010/0117858 A1 | 5/2010 | Rozenboim | |
| 2010/0118985 A1 | 5/2010 | Rozenboim | |
| 2010/0127570 A1 | 5/2010 | Hadar et al. | |
| 2010/0183093 A1 | 7/2010 | Ghannouchi et al. | |

FOREIGN PATENT DOCUMENTS

| | | |
|---|---|---|
| EP | 1 617 538 A1 | 1/2006 |
| WO | WO 01/15334 A1 | 3/2001 |
| WO | WO 2010/062662 A2 | 6/2010 |
| WO | WO 2010/062662 A3 | 6/2010 |
| WO | WO 2011/023526 A1 | 3/2011 |

OTHER PUBLICATIONS

"Signalling on low-voltage electrical installations in the frequency range 3kHz to 148,5 kHz"; British Standard, BS EN 50065-1:2001; Part 1: General requirements, frequency bands and electromagnetic disturbances, 28 Pages.

"56800 Hybrid Controller", Zdenek Kaspar et al., Motorola, Power Line Modem Reference Design, Freescale Semiconductor, Inc., www.freescale.com; 178 Pages.

International Search Report and Written Opinion mailed Apr. 1, 2011 for PCT Application No. PCT/US2010/046942.

Non-Final Office Action mailed Aug. 19, 2011 for U.S. Appl. No. 12/807,089 entitled "Power Line Communications Apparatus".

International Search Report attached to WO 2011/023526 A1 for PCT Application No. PCT/EP2010/061551, date of mailing on report Feb. 12, 2010.

* cited by examiner

*Primary Examiner* — Kevin Kim
(74) *Attorney, Agent, or Firm* — Moser Taboada

(57) ABSTRACT

Apparatus and system for communicating data via a power line. The apparatus comprises a transmitter comprising a modulator for generating a second digital signal based on input data; a digital buffer for amplifying the second digital signal to generate a third digital signal; a filter for filtering the third digital signal to generate an analog output waveform; and a coupler for coupling the analog output waveform to the power line.

8 Claims, 4 Drawing Sheets

POWER LINE COMMUNICATIONS APPARATUS

CROSS-REFERENCE TO RELATED APPLICATIONS

The present invention is a continuation of commonly assigned co-pending U.S. patent application Ser. No. 12/807,089, filed Aug. 27, 2010, which claims benefit of U.S. provisional patent application Ser. No. 61/275,350, filed Aug. 28, 2009. Each of the aforementioned patent applications is herein incorporated in its entirety by reference.

BACKGROUND OF THE INVENTION

1. Field of the Invention

Embodiments of the present disclosure relate generally to power line communications and, more particularly, to an apparatus for providing communication over power lines.

2. Description of the Related Art

Power Line Communications (PLC) is a technology for utilizing power lines, such as the existing commercial AC power grid infrastructure, to communicate data between devices coupled to the power lines. PLC typically operates in a point-to-multipoint fashion where one transmitter at a time transmits over the power line while other devices coupled to the power line receive the transmitted signal.

For PLC transmission, a transmitter is generally coupled to the power line through an isolation transformer and sends a voltage stimulus on the power line (i.e., a voltage-based signal) in accordance with relevant standards for PLC, such as BS EN 50065-1:2001 "Specification for Signaling on Low-Voltage Electrical Installations in the Frequency Range 3 kHz to 148.5 kHz". These relevant standards set forth specifications for PLC operation, such as a maximum voltage level. As a result of power lines having undefined and variable impedances within the frequency band of interest for PLC, a transmitter module may be required to generate a large amount of current, for example on the order of hundreds of milliamperes, in order to meet the PLC voltage requirements.

Generally, PLC transmitters use linear amplifiers to achieve the required amplification and signal processing for PLC transmission. However, such devices dissipate high levels of power when operating to drive large currents on the power line and thus decrease the efficiency of the PLC transmitters. Additionally, the PLC transmitters generally perform filtering prior to the power amplification in order to satisfy spectral purity requirements set forth in the relevant standards, requiring a large number of costly components.

For receiving data transmitted over the power line, a PLC receiver is typically also coupled to the power line through an isolation transformer. The PLC receiver is required to provide a large input impedance to limit noise from the power line into the receiver prior to amplification, thereby requiring a costly number of components to perform such functions.

Therefore, there is a need in the art for an apparatus for efficient power line communications.

SUMMARY OF THE INVENTION

Embodiments of the present invention generally relate to an apparatus and system for communicating data via a power line. The apparatus comprises a transmitter comprising a modulator for generating a second digital signal based on input data; a digital buffer for amplifying the second digital signal to generate a third digital signal; a filter for filtering the third digital signal to generate an analog output waveform; and a coupler for coupling the analog output waveform to the power line.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
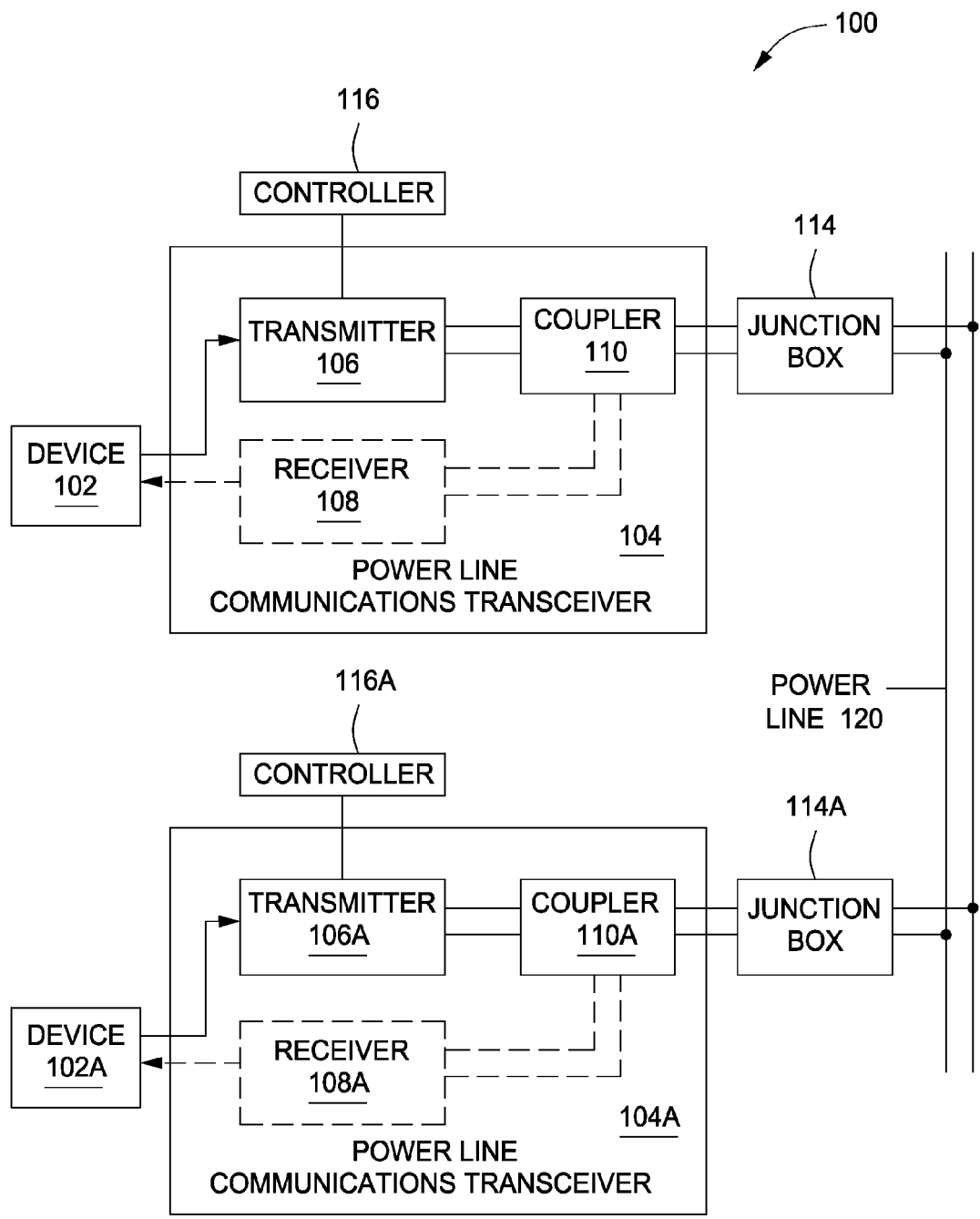
FIG. 1 is a block diagram of a system for communicating data over an AC power line in accordance with one or more embodiments of the present invention.

FIG. 1 is a block diagram of a system 100 for communicating data over an AC power line in accordance with one or more embodiments of the present invention. The system 100 comprises a device 102 coupled to a power line communications transceiver (PLCT) 104, which is further coupled to an AC power line 120 ("power line 120") via a junction box 114. Additionally, the system 100 comprises a device 102A coupled to a PLCT 104A, which is further coupled to the power line 120 via a junction box 114A. The devices 102 and 102A are devices requiring communications bandwidth for transmitting and/or receiving data, such as a home computer, peripheral device, and the like, and are capable of communicating with one another over the power line 120 via the PLCTs 104 and 104A, respectively. In some embodiments, the PLCT 104 and/or the PLCT 104A may be coupled directly to the power line 120 without the use of junction boxes 114/114A. One particular embodiment that uses the inventive system is described below with respect to FIG. 5.

The PLCT 104 comprises a transmitter 106 and a receiver 108, each coupled to the device 102, and a coupler 110 that couples both the transmitter 106 and the receiver 108 to the junction box 114. When the PLCT 104 is operating in a "transmit mode", the transmitter 106 is capable of transmitting data to the device 102A via the power line 120. The receiver 108 is capable of receiving data from the device 102A via the power line 120. The PLCT 104 may be able to simultaneously receive and transmit data; however, the transmitter 106 may generally blind the receiver 108 while active. In some embodiments, a controller 116 is coupled to the transmitter 106 and provides a control signal for enabling and disabling the transmit mode. The controller 116 may be separate from the PLCT 104 as depicted in FIG. 1, or, alternatively, the controller 116 may be a component of the PLCT 104.

Analogous to the PLCT 104, the PLCT 104A comprises a transmitter 106A, a receiver 108A, and a coupler 110A. The transmitter 106A and receiver 108A are coupled to the device 102A as well as the coupler 110A, and the coupler 110A is further coupled to the junction box 114A. When the PLCT 104A is operating in a transmit mode, the transmitter 106A is capable of transmitting data to the device 102 via the power line 120. The receiver 108A is capable of receiving data from the device 102 via the power line 120. The PLCT 104A may be able to simultaneously receive and transmit data; however, the transmitter 106A may generally blind the receiver 108A while active. In some embodiments, a controller 116A is coupled to the transmitter 106A and provides a control signal for enabling and disabling the transmit mode. The controller 116A may be separate from the PLCT 104A as depicted in FIG. 1, or, alternatively, the controller 116A may be a component of the PLCT 104A.

In accordance with one or more embodiments of the present invention, when operating in the transmit mode the transmitter 106 receives digital input data from the device 102 and digitally processes the received data through a voltage amplification stage to generate digitally processed data. Following the voltage amplification stage, the transmitter 106 generates an analog voltage waveform for transmitting the digitally processed data over the power line 120 such that the analog voltage waveform characteristics (e.g., frequency, magnitude, spectral purity, and the like) meet relevant standards for PLC. In some embodiments, the analog voltage waveform may be generated to have a frequency within the band 50-500 KHz (for example, in the 95-148 KHz band) and a maximum voltage on the order of 1 volt root mean square (RMS), i.e., 120 decibel/microvolt (dBμV). The coupler 110 couples the generated analog voltage waveform to the power line 120.

During the transmit mode, the transmitter 106 presents a minimal impedance (e.g., within a range of 1-5 ohms) to the power line 120. In order to meet required output voltage levels given the variability of impedance on the power line 120, the transmitter 106 is capable of driving large currents, for example on the order of hundreds of milliamperes, on the power line 120. In order to drive such large currents, the transmitter 106 may employ a high-current rated complementary metal-oxide-semiconductor (CMOS) buffer, as described further below, for performing the voltage amplification in the digital domain and driving the necessary current levels.

When the PLCT 104 is receiving, the coupler 110 couples an analog signal from the power line 120 to the receiver 108. The receiver 108 converts the received analog voltage waveform to digital output data and provides the digital output data to the device 102. In some embodiments, the digital output data may be a digital representation of a modulated signal; for example, the digital output data may be a digital representation of an FSK signal (a digital FSK signal), and an FSK demodulator is contained within the device 102 or coupled between the receiver 108 and the device 102. The receiver 108, as further described below, may comprise a band-pass filter for filtering the received waveform to remove noise inherent to the power line 120. When the transmit mode is disabled, the PLCT 104 presents a large input impedance to the power line 120 (e.g., on the order of kilo-ohms). Such a large input impedance prevents the transmitter 106 from being "swamped out" when a large number of nodes are present on the power line 120.

In some alternative embodiments, the PLCT 104 comprises only the transmitter 106 and the coupler 110 for transmitting information via the power line 120; additionally or alternatively, the PLCT 104A may comprise only the transmitter 106A and the coupler 110A for transmitting information via the power line 120. In such embodiments, the receivers 108 and/or 108A are not used. The optional nature of including a receiver is represented by the dashed boxes of receivers 108 and 108A.

Figure 2:
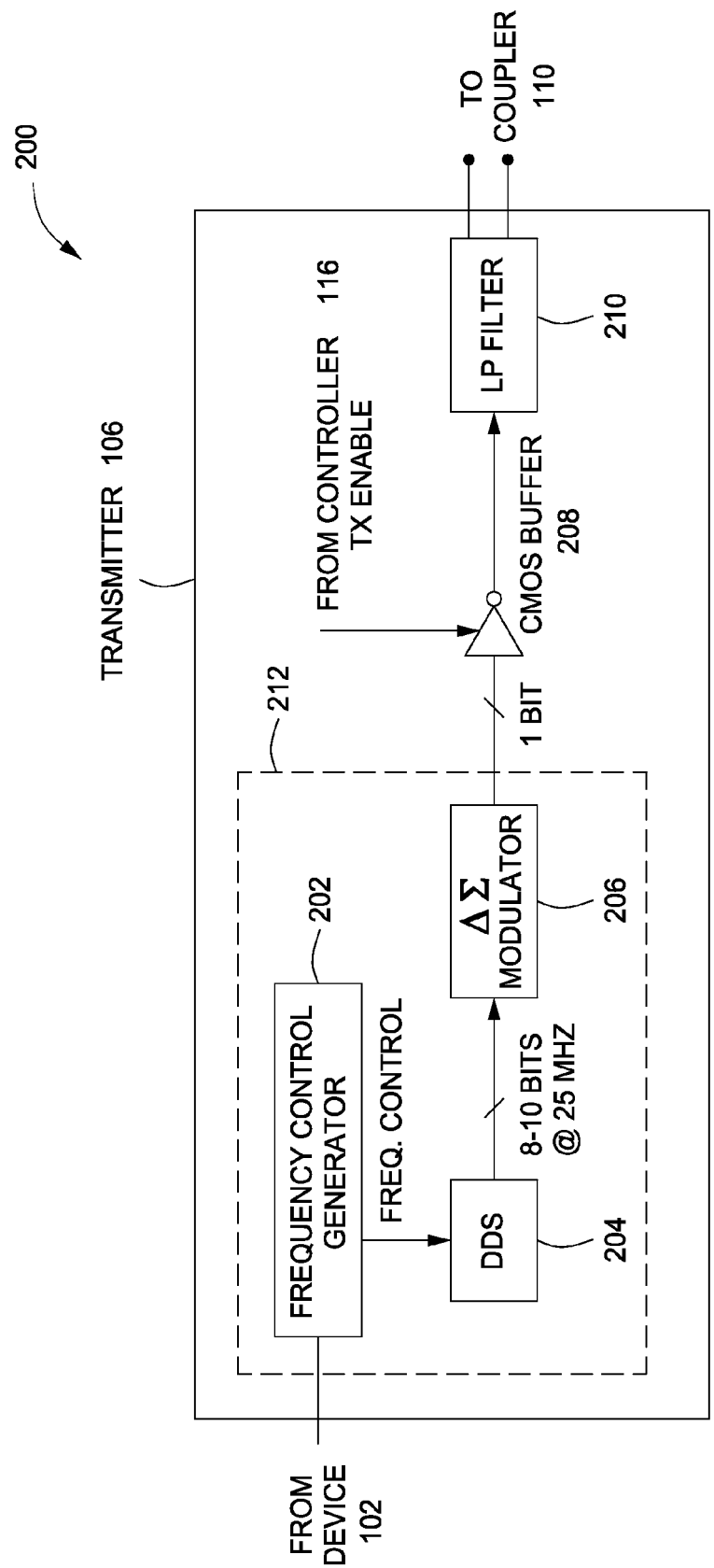
FIG. 2 is a block diagram of a transmitter in accordance with one or more embodiments of the present invention.

FIG. 2 is a block diagram of a transmitter 106 in accordance with one or more embodiments of the present invention. The transmitter 106 comprises a frequency control generator 202 coupled to a direct digital synthesizer (DDS) 204, which is further coupled to a delta-sigma (ΔΣ) modulator 206. The ΔΣ modulator 206 is coupled to a CMOS buffer 208, and an output from the CMOS buffer 208 is coupled to a low-pass filter 210. The CMOS buffer 208 is additionally coupled to the controller 116 for receiving an input to enable/disable the transmit mode. When the transmit mode is enabled, the CMOS buffer 208 presents a low transmit impedance (e.g., on the order of 1-5 ohms); when the transmit mode is disabled, the CMOS buffer 208 present a large input impedance (e.g., on the order of kilo-ohms).

The frequency control generator 202 is coupled to the device 102 for receiving a digital input data signal for transmission over the power line 120. The frequency control generator 202 generates a digital frequency control signal (for example, a 16 to 24 bit signal) based on the received data signal and couples the digital frequency control signal to the DDS 204. The DDS 204 operates at a high frequency and, in accordance with the frequency control signal, generates a digital frequency-shift keying (FSK) signal (i.e., a digital representation of an FSK signal). In some embodiments, the digital FSK signal may be on the order of 8-10 bits wide at a frequency of 25 MHz; alternatively, the digital FSK signal may comprise fewer or more bits and/or may be at a different frequency. In some alternative embodiments, minimum FSK modulation may be utilized; in some other alternative embodiments, modulation techniques other than FSK modulation may be utilized, such as M-ary quadrature amplitude modulation (QAM), quadrature phase-shift keying (QPSK), phase-shift keying (PSK), orthogonal frequency-division multiplexing (OFDM), pulse-amplitude modulation (PAM), or the like.

The DDS 204 output signal is coupled to the ΔΣ modulator 206, which may be a single-stage ΔΣ modulator or a multi-stage ΔΣ modulator. The ΔΣ modulator 206 encodes the received digital FSK signal utilizing pulse-density modulation (PDM) and provides a digital 1-bit output signal representing the received digital FSK signal. In some embodiments, the ΔΣ modulator 206 may operate at a frequency of 25 MHz; in alternative embodiments, the ΔΣ modulator 206 may operate at a different frequency.

The frequency control generator 202, DD2 204, and ΔΣ modulator 206 form a modulator 212 that generates a digital signal based on the digital input data signal from the device 102. The digital signal from the modulator 212 (i.e., the output of the ΔΣ modulator 206) is coupled to the CMOS buffer 208 for amplifying the voltage. The CMOS buffer 208 may be a high-current rated CMOS buffer capable of providing sufficient current (e.g., hundreds of milliamperes) to maintain a required output voltage level when the power line impedance is very low; in some embodiments, the CMOS buffer 208 may be on the order of 0.15 to 0.25 micron technology. In some embodiments, the CMOS buffer 208 may comprise a plurality of buffers (e.g., sixteen buffers) coupled in parallel, each buffer capable of producing current on the order of 50 mA. The number of buffers coupled in parallel determines the amount of current that can be driven and is considered a design choice for the system.

Following the voltage amplification, the CMOS buffer 208 produces a digital output signal which is coupled to the low-pass filter 210 and filtered to generate an analog output. As a result of the ΔΣ modulator 206 running at a high frequency, for example 25 MHz, the low-pass filtering can be performed in the MHz frequency band to remove sufficient artifacts resulting from the ΔΣ modulation. The output of the low-pass filter 210 is coupled to the power line 120 through the coupler 110, as explained further below with respect to FIG. 4.

Figure 3:
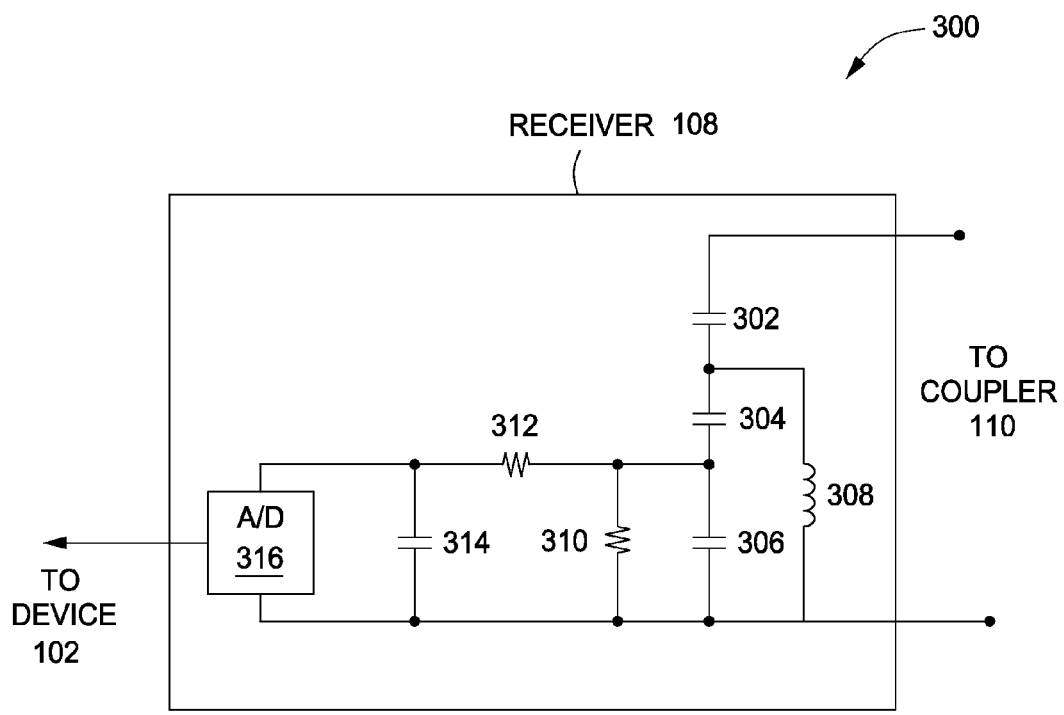
FIG. 3 is a block diagram of a receiver in accordance with one or more embodiments of the present invention.

FIG. 3 is a block diagram of a receiver 108 in accordance with one or more embodiments of the present invention. The receiver 108 receives an analog voltage waveform from the power line 120 through the coupler 110, as further described below, and generates a digital output data signal that is coupled to the device 102.

The receiver 108 comprises capacitors 302, 304, 306, and 314; an inductor 308; resistors 312 and 310; and an analog-to-digital (A/D) converter 316. In some embodiments, one or more the capacitors/inductor/resistors may be a parasitic component. The capacitors 302, 304, and 306 are coupled in series such that the capacitor 302 is coupled to the capacitor 304 which is in turn coupled to the capacitor 306, and the received analog waveform is coupled from the coupler 110 across the series combination of capacitors 302, 304, and 306. The inductor 308 is coupled across the series combination of the capacitors 304 and 306. The capacitors 302, 304, and 306 and the inductor 308 perform band-pass filtering of the received analog voltage waveform to reduce noise that is inherently present on the power line 120 (i.e., to pass the signal of interest with minimal phase/amplitude distortion).

The resistor 310 is coupled across the capacitor 306. The resistor 312 is coupled between a first terminal of the resistor 310 and a first terminal of the capacitor 314; a second terminal of the resistor 310 is coupled to a second terminal of the capacitor 314. The A/D converter 316 is coupled across the capacitor 314 and is further coupled to the device 102. The resistors 310 and 312 form a high impedance resistive load, and the A/D converter 316 samples the voltage across this load to produce an FSK-modulated digital output signal for the device 102 (i.e., a digital representation of an FSK signal). In some embodiments, the device 102 comprises an FSK demodulator for demodulating the digital output signal; alternatively, an FSK demodulator may be coupled between the receiver 108 and the device 102. In some alternative embodiments, the digital output data signal may be a digital representation of a minimum FSK modulated signal, a QAM modulated signal, a QPSK modulated signal, a PSK modulated signal, an OFDM modulated signal, a PAM modulated signal, or the like.

In some embodiments, the resistors 310 and 312 may each be on the order of a few hundred ohms; the capacitors 304, 306, and 314 may each be on the order of a few nanofarads; the capacitor 302 may be on the order of several hundred picofarads; and the inductor 308 may be on the order of a few hundred microhenries.

Figure 4:
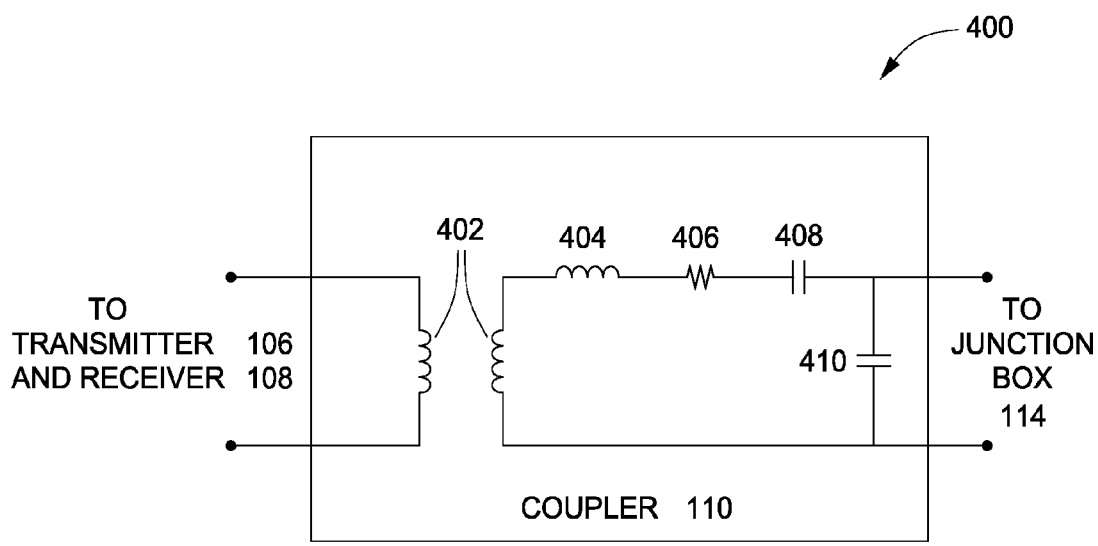
FIG. 4 is a block diagram of a coupler in accordance with one or more embodiments of the present invention.

FIG. 4 is a block diagram of a coupler 110 in accordance with one or more embodiments of the present invention. The coupler 110 comprises a transformer 402, an inductor 404 to represent a leakage inductance of the transformer 402, a resistor 406, and capacitors 408 and 410. In some embodiments, the coupler 110 may be simplified. Generally, the transmit signal must be low pass filtered without increasing the output impedance and loading the receiver while inactive; the receive signal must be band pass filtered to pass the signal of interest and attenuate out of band noise, while maintaining high impedance in the band of interest.

The transformer 402 is an isolation transformer having a high coupling factor; for example, the coupling factor may be 0.95 or greater. Generally, the transformer 402 has a 1:1 turns ratio, although other turns ratios may also be utilized. A primary winding of the transformer 402 is coupled across each of the transmitter 106 and the receiver 108. A first terminal of a secondary winding of the transformer 402 is depicted as coupled to a first terminal of the inductor 404. The resistor 406 is coupled between a second terminal of the inductor 404 and a first terminal of the capacitor 408, which provides a safety function for coupling to the power line 120. The resistor 406 acts to damp an RLC tank formed by the resistor 406, the inductor 404, and the capacitor 408.

The capacitor 410 is coupled between a second terminal of the capacitor 408 and a second terminal of the secondary winding of the transformer 402, and is further coupled across two output terminals of the coupler 110 for coupling to the power line 120 through the junction box 114. The capacitor 410 provides an optional low-pass filtering function; in some alternative embodiments, the capacitor 410 may be removed from the coupler 110.

The coupler 110 couples the outbound analog voltage waveform from the transmitter 106 to the power line 120 and couples the inbound analog voltage waveform from the power line 120 to the receiver 108.

In some embodiments, the primary and secondary windings of the transformer 402 each have an inductance on the order of a few hundred microhenries; the inductor 404 (i.e., the leakage inductance of the transformer 402) is on the order of a few microhenries; the resistor 406 is on the order of a few ohms; the capacitor 408 is on the order of a few hundred nanofarads; and the capacitor 410 is on the order of a few nanofarads.

Figure 5:
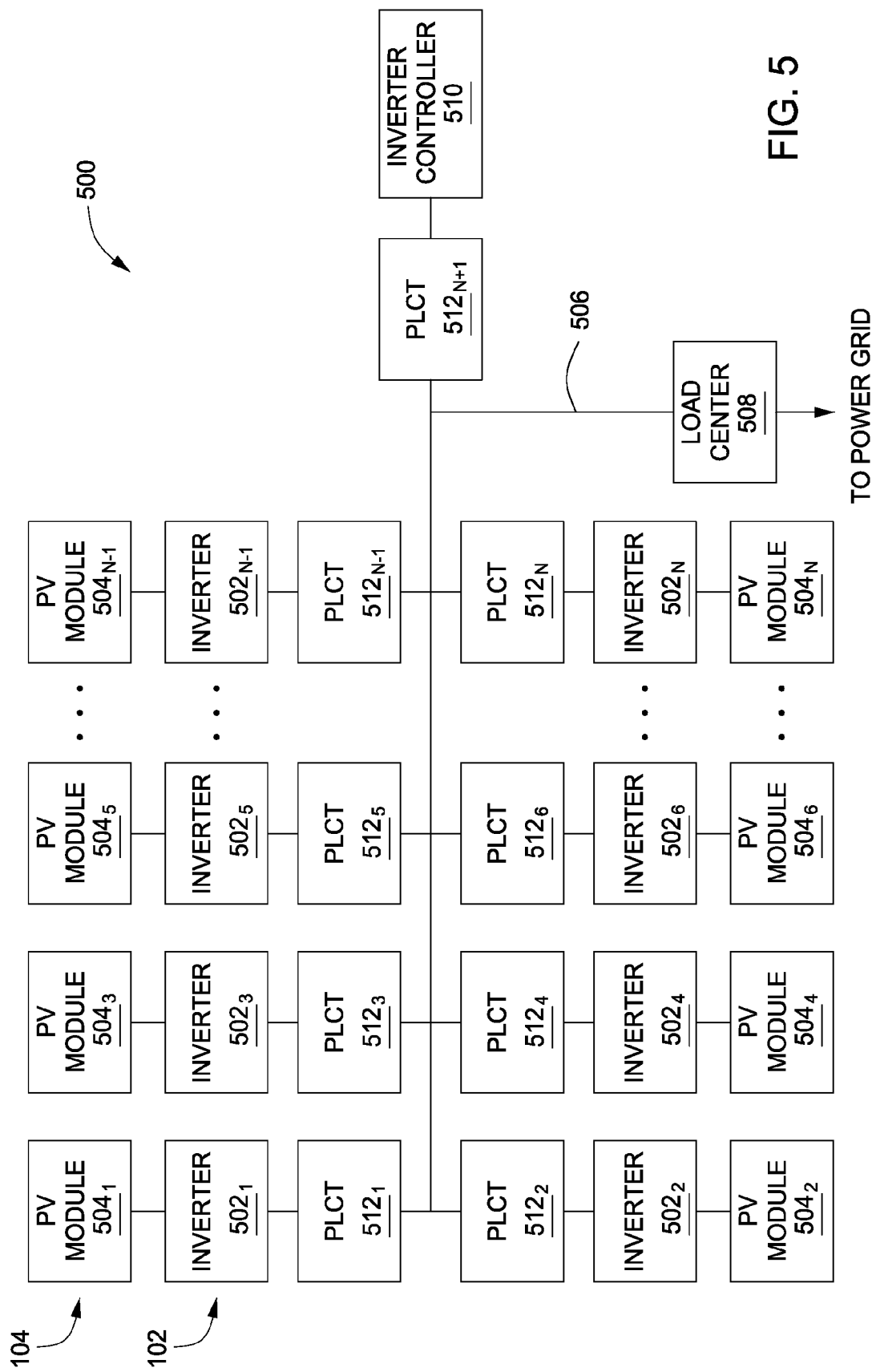
FIG. 5 is a block diagram of a system for inverting solar generated DC power to AC power using one or more embodiments of the present invention.

FIG. 5 is a block diagram of a system 500 for inverting solar generated DC power to AC power using one or more embodiments of the present invention. This diagram only portrays one variation of the myriad of possible system configurations and devices that may utilize the present invention. The present invention can be utilized by any device for power line communication, and can function in a variety of distributed environments and systems requiring communications over power lines.

The system 500 comprises a plurality of inverters $502_1$, $502_2 \ldots 502_n$, collectively referred to as inverters 502, a plurality of PV modules $504_1$, $504_2 \ldots 504_n$, collectively referred to as PV modules 504, a plurality of PLCTs $512_1$, $512_2 \ldots 512_n$, $512_{n+1}$, collectively referred to as PLCTs 512, AC power line 506, an inverter controller 510, and a load center 508.

Each inverter $502_1$, $502_2 \ldots 502_n$ is coupled to a PLCT $512_1$, $512_2 \ldots 512_n$, respectively; in some alternative embodiments, each of the PLCTs $512_1$, $512_2 \ldots 512_n$ may be contained within the corresponding inverter $502_1$, $502_2 \ldots 502_n$. Each inverter $502_1$, $502_2 \ldots 502_n$ is additionally coupled to a PV module $504_1$, $504_2 \ldots 504_n$, respectively. The inverter controller 510 is coupled to the PLCT $512_{n+1}$.

The PLCTs 512 are coupled to the AC power line 506 and operate analogously to the PLCTs 104 and 104A described above. In some embodiments, each of the PLCTs 512 may be coupled to a controller (i.e., one controller per PLCT 512), such as controller 116, for enabling/disabling a transmit mode of the PLCT 512. The AC power line 506 is further coupled to the load center 508 which houses connections between incoming commercial AC power lines from a commercial AC power grid distribution system and the AC power line 506. The inverters 502 convert DC power generated by the PV modules 504 into AC power, and meter out AC current that is in-phase with the commercial AC power grid voltage. The system 500 couples the generated AC power to the commercial AC power grid via the load center 508.

The inverter controller 510 is capable of receiving data from the inverters 502 and issuing command and control signals to the inverters 502 for controlling the functionality of the inverters 502. In accordance with one or more embodiments of the present invention, the PLCTs 512 enable such communication between the inverters 502 and the inverter controller 510 over the AC power lines 506. As previously described, the PLCTs 512 digitally process digital input data from the inverters 502 and/or the inverter controller 510 through a voltage amplification stage and generate a corresponding analog voltage waveform that is coupled to the AC power lines 506 for transmitting the received digital input data. Also, as previously described, the PLCTs 512 receive an analog voltage waveform from the AC power line 506 and process the received waveform to produce digital output data that is coupled to the inverters 502 and/or the inverter controller 510, thereby allowing the inverters 501 and the inverter controller 510 to communicate over the AC power lines 506.

While the foregoing is directed to embodiments of the present invention, other and further embodiments of the invention may be devised without departing from the basic scope thereof, and the scope thereof is determined by the claims that follow.

The invention claimed is:

1. Apparatus for communicating via a power line, comprising:
   a transmitter comprising a modulator for generating a second digital signal based on input data;
   a digital buffer for amplifying the second digital signal to generate a third digital signal;
   a filter for filtering the third digital signal to generate an analog output waveform that complies with at least one standard for Power Line Communication (PLC); and
   a coupler for coupling the analog output waveform to the power line; wherein the modulator further comprises a direct digital synthesizer for generating a first digital signal based on the input data and a delta-sigma modulator for generating the second digital signal based on the first digital signal.

2. The apparatus of claim 1, wherein the first digital signal is a digital frequency shift keying (FSK) signal and the second digital signal is a pulse density modulated (PDM) signal.

3. The apparatus of claim 1, wherein the digital buffer presents a minimal impedance during a transmit mode.

4. The apparatus of claim 1, further comprising a receiver for receiving an analog input waveform from the power line via the coupler and generating a digital output signal based on the analog input waveform.

5. The apparatus of claim 4, wherein the receiver is capable of receiving the analog waveform when a transmit mode is disabled.

6. The apparatus of claim 5, wherein the digital buffer presents a higher impedance when the transmit mode is disabled than when the transmit mode is enabled.

7. The apparatus of claim 1, wherein the coupler comprises a transformer, a resistor, a first capacitor and a second capacitor, wherein a primary winding of the transformer is coupled across an output of the transmitter; a secondary winding of the transformer is coupled across a series combination of the resistor, the first and the second capacitors, and an output of the coupler is coupled across the second capacitor.

8. The apparatus of claim 1, wherein the receiver comprises an analog to digital (A/D) converter, a first capacitor, a second capacitor, a third capacitor, a fourth capacitor, a first resistor, a second resistor, and an inductor; wherein the a/d converter is coupled across the first capacitor; a first terminal of the first resistor is coupled to a first terminal of the first capacitor and a second terminal of the first resistor is coupled to a first terminal of the second resistor, a first terminal of the second capacitor, and a first terminal of the third capacitor; a second terminal of the third capacitor is coupled to a first terminal of the fourth capacitor and a first terminal of the inductor; a second terminal of the inductor is coupled to a second terminal of the second capacitor, a second terminal of the second resistor, and a second terminal of the first capacitor; and an input to the receiver is coupled across a second terminal of the fourth capacitor and a second terminal of the inductor.

* * * * *